United States Patent [19]

Rothstein

[11] 3,754,125

[45] Aug. 21, 1973

[54] VENT GAS CONTROL SYSTEM
[75] Inventor: Mark B. Rothstein, Pennsville, N.J.
[73] Assignee: E. I. du Pont de Nemours and Company, Wilmington, Del.
[22] Filed: Jan. 6, 1971
[21] Appl. No.: 104,218

[52] U.S. Cl............ 235/151.12, 23/253 A, 260/580
[51] Int. Cl. ............................................ C07c 85/10
[58] Field of Search .............................. 235/151.12; 23/253 A; 260/580

[56] References Cited
UNITED STATES PATENTS
3,032,586   5/1962   Dierichs et al...................... 260/580

OTHER PUBLICATIONS

"Control of Reactors Involving Gas Recycle and Purge Streams" by Carter, Control, November 1964, pp. 561-565.

Primary Examiner—Eugene G. Botz
Attorney—Raymond E. Blomstedt

[57]     ABSTRACT

A process and apparatus for reacting a gas and a liquid by selectively adjusting the vent gas rate in relation to the liquid feed rate, impurities in the gas feed and impurities in the vent gas.

6 Claims, 1 Drawing Figure

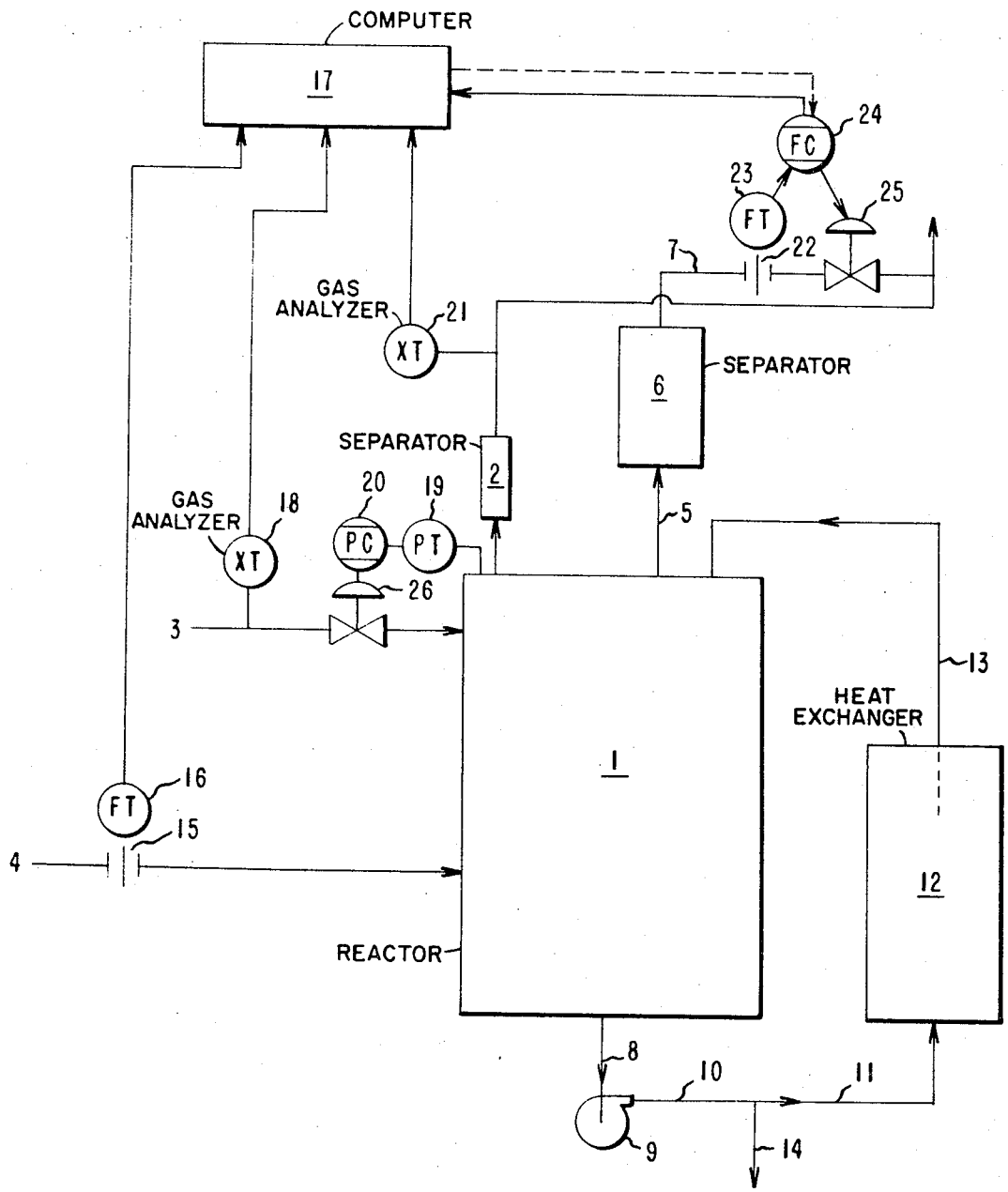

ary from a change in the level of impurities in the gas feed. The vent rate is controlled by valve 25 which is set by signals from controller 24. Signal transmitter 26 sends a signal to the computer representative of the vent gas impurity (e.g., methane) concentration. The vent gas passes through conduit 18 to chromatograph 19. Signals are sent by transmitter 20 representative of the impurity content of the hydrogen feed to analog computer 17 which calculates the required set point for the vent gas flow controller 24 in accordance with the programmed equation above. Transmitter 21 transmits to computer 17 a signal representative of the dinitrotoluene feed rate. Signal transmitter 26 transmits a signal representative of the vent gas impurity concentration. Hydrogen gas feed enters through conduit 2 past chromatograph 15 which is connected via signal transmitter 16 with the computer 17.

VENT GAS CONTROL SYSTEM

BACKGROUND OF THE INVENTION

This invention relates to a process and apparatus for reducing the amount of reactant gas vented in order to purge impurities during a process for reacting a gas with a liquid.

In industrial processes in which a liquid is reacted with a gas, it is desirable to maintain the overall rate of reaction with some minimum acceptable value. In accordance with the well-known mass-action principles, achievement of such a reaction rate requires a high gas purity in the reactor. Maintaining the reactant gas purity in the reactor above an acceptable minimum is usually accomplished by periodically or continuously venting impure reactant gas from the reactor and replacing it with purer reactant gas. In reacting hydrogen with dinitrotoluene, for example, it is desirable to control the hydrogen concentration in the vent gas at 70–90 mole percent when using a feed-hydrogen purity of 99.5 percent. If the hydrogen concentration of the vent gas exceeds this amount, an undue loss of hydrogen in the vent gas results, adding to the cost of the product. At lower hydrogen concentration on the other hand the reaction proceeds too slowly and inefficiently with resultant higher costs.

Known methods for controlling the rate of reactant gas vented include both manual and automatic systems. Manual procedures are ineffective, uneconomical and slow. Automatic feedback systems, those involving analysis of vented gas and proportionate adjustment of the gas feed rate and gas vent rate are unsatisfactory due to the process time constant from an upset (e.g., in the purity of the gas feed) and the first indication of the upset in the form of a change in the vent gas composition. With such systems impurity concentration in the reactor fluctuates over an unacceptably wide range. There has been a need for a process which would anticipate feed supply upsets and control the reaction conditions so that the purity of reactant gas in the reactor is maintained within a narrow range corresponding to efficient utilization of reactants and production of product at an efficient rate.

SUMMARY OF THE INVENTION

This invention provides a process and apparatus for reacting a liquid and a gas under controlled conditions. This invention consists essentially of a process and apparatus for controlling the amount of reactant gas (e.g., hydrogen) vented during the reaction of the gas with a liquid (e.g., dinitrotoluene) in a closed reactor having a gas feed, a liquid feed, separate liquid and gas phases existing in the reactor, a liquid take-off and a gas take-off by:

a. measuring the liquid feed rate to the reactor and transmitting a signal representative of this rate,
b. analyzing the gas feed for impurities and transmitting a signal representative of the concentration of impurities in the gas feed,
c. analyzing the impurities in the gas phase of the reactor and transmitting a signal representative of the concentration of impurities in the gas phase of the reactor,
d. receiving said transmitted signals in an analog computer programmed to determine the gas venting rate (V) required to adjust the gas purity in the reactor to a predetermined level according to the equation:

$$(V)^2 = (0.132)^2 (F)^2 [X_1 + K(e + (de/dt)\gamma)]^2 / (X_2)^2 \quad (1)$$

where:
$F$ = dinitrotoluene feed rate (e.g., 4,540 Kg./hr.)
$X_1$ = actual impurity concentration in the feed hydrogen (0.5 mole percent normally)
$X_2$ = actual impurity concentration of the vent gas (13.0 mole percent at normal steady state)
$e$ = error difference between the desired (normal) and the actual impurity concentration of the vent gas ($e=0$ for steady state conditions) in mole percent
$K$ = controller gain (percent per volt)
$\gamma$ = process time constant of gas contained in the reactor and the vent gas system (minutes)
$t$ = time (minutes)
$V$ = vent gas flow rate on water-wet basis (33.3 Kg./hr. at normal steady state)

and transmitting a signal from the computer representative of the resulting vent gas flow rate, to a gas vent controller to adjust the set point of the vent gas flow rate to the rate determined by the computer.

This invention also provides the control system necessary to operate the process.

BRIEF DESCRIPTION OF THE DRAWING

The drawing is a schematic sketch of a process for hydrogenating dinitrotoluene utilizing the vent control system of this invention.

DETAILS OF THE INVENTION

This invention will be described as it applies to a preferred embodiment of the invention, the hydrogenation of dinitrotoluene, but it is also useful for other liquid-gas reactions.

Referring to the drawing, hydrogen (H$_2$) gas and liquid dinitrotoluene (DNT) are fed into reactor 1 through conduits 3 and 4, respectively. Vent gas leaves the reactor through conduit 5, enters separator 6 where small amounts of tolylene diamine and water are separated from the gas, and is vented through conduit 7 through orifice plate 22 which measures the vent gas flow rate. A flow rate signal from 22 is sent via transmitter 23 to flow controller 24 which sends a signal representative of such rate to both an analog computer 17 and vent gas flow control valve 25. Liquid tolylene diamine is drawn from the bottom of the reactor through conduit 8, pump 9 and conduit 10 and recirculated through conduit 11, heat exchanger 12 and conduit 13 into the top of the reactor, but a minor portion of the liquid stream is drawn off through conduit 14 as product.

The control system of this invention involves measuring (1) the dinitrotoluene feed rate, (2) the concentration of impurities in the hydrogen feed, and (3) the concentration of impurities in the gas phase existing in the reactor and transmitting signals representative of these measurements to an analog computer which uses this information to solve programmed equation (1). The computer issues a signal representing the rate at which gas must be vented from the reactor in order to offset variations from normal steady state operations which occur or to maintain such operations in the absence of upsets, as the case may be.

The dinitrotoluene feed rate to the reactor is sensed by orifice plate 15 and a signal representative of this flow rate is transmitted by flow transmitter 16 to analog computer 17. The hydrogen feed to the reactor is analyzed by a Thermatron gauge 18 manufactured by the Mine Safety Appliance Company and a signal representing the concentration of impurities is sent to computer 17. The hydrogen feed rate is also used to control the pressure in the reactor 1 by the pressure transmitter 19 and the pressure controller 20. In controller 20, the reactor pressure is compared with a manually adjusted set point which controls the hydrogen feed flow rate valve 26 so that the indicated difference is reduced to zero by controller 20. The gas phase in the reactor is analyzed for impurities by a second Thermatron analyzer 21 located downstream of separator 2 in a line provided for this measurement. Thermatron analyzer 21 sends a signal representing the concentration of impurities in the gas phase to computer 17.

Computer 17 is programmed to use the information supplied to solve equation (1) above.

Under normal steady state operating conditions for hydrogenating dinitrotoluene utilizing hydrogen gas containing 0.5 mole percent of impurities (mostly methane but possibly other gases inert toward the hydrogenation reaction), a hydrogen gas feed rate of 321 Kg./hr. and a dinitrotoluene feed rate of 4,540 Kg./hr. requires a gas venting rate of about 33.3 Kg./hr. for optimum efficiency in terms of the production rate of toluene diamine product and losses of unreactive hydrogen gas in the vented gases. Venting of gases is, of course, essential to prevent undue build-up of impurities in the reactor with consequent adverse effect upon the production rate of desired product. Gas vented under the above steady state conditions will contain about 10–15 mole percent impurities.

The computer utilized can be any general-purpose analog computer which can be programmed to solve equation (1) above. An Electronics Associates Model No. TR48 analog computer has been found to be satisfactory but other similar apparatus can be used.

The operation of this invention can be understood from the following discussion which clarifies the application of feedforward and feedback concepts of control. In feed-forward control, the hydrogen flow rate is proportioned stochiometrically to the DNT feed rate, as follows $$H_{FF}{}^S = \frac{12F}{182\left(1-\frac{X_1}{100}\right)} = 0.0660\left(\frac{F}{1-\frac{X_1}{100}}\right) \quad (2)$$

where F and $X_1$ are defined following equation (1) and $H_{FF}{}^S$ = stochiometric amount of hydrogen, lb./hr., containing $X_1$ mole percent impurities required to reduce F lb. DNT/hr. to tolylene diamine product. The term $H_{FF}{}^S$ only includes stochiometric allowance for the reduction of dinitrotoluene to tolylene diamine and does not include allowance for the vent gas flow rate.

The feedback correction is the term $K(e + (de/dt)\gamma)$ where the variables are defined following equation (1).

The operation of this feedback correction can be understood most clearly as follows. The vent gas rate is given by the following material balance:

$$V^2 = (0.132)^2 F^2 \frac{(1.875 + 0.07X_2)^2}{\left(2\frac{X_2}{X_1} - 1.782\right)^2} \quad (3)$$

Equation (3) can be approximated by the following equation:

$$V^2 = (0.132)^2 F^2 (X_1{}^=)^2/(X_2)^2 \quad (4)$$

where V, F, $X_1$, and $X_2$ are defined following equation (1) and the term $X_1{}^=$ has the following value:

$$(X_1{}^=)^2 = [X_1 + K(e + (de/dt)\gamma)]^2 \quad (5)$$

The value of V calculated from equation (3) is not the same as that calculated from equation (4) for the condition $K(e + (de/dt)\gamma) = 0$ as can be seen from Table I following:

TABLE I

| Feed Rate F, Kg. DNT/hr. | Impurity Conc'n, mole % | | Vent Rate, V, Kg./hr. | | Excess Hydrogen % |
|---|---|---|---|---|---|
| | $X_1$ | $X_2$ | Eq. (3) | Eq. (4) | |
| 4540 | 0.5 | 13.0 | 33.3 | 23.0 | 1.99 |
| 4540 | 0.75 | 13.0 | 51.1 | 34.5 | 4.64 |
| 4540 | 0.75 | 25.4 | 33.2 | 17.7 | 1.93 |
| 5440 | 0.75 | 13.0 | 39.8 | 41.5 | 4.64 |

The vent rate calculated from equation (4) differs appreciably from the exact value calculated from equation (3). However, in practice, the feedback term $K(e + (de/dt)\gamma)$ does not have the value zero but rather has a finite value such that the vent rate V calculated from the simplified equation (4) is automatically made equal to the exact value of V calculated from equation (3) by the control system of this invention. The net result of feedback control is that a new value of the concentration of impurities in the hydrogen feed, $X_1{}^=$, is created in order to control the concentration of impurities in the vent gas, $X_2$, to any specified value. Because of the adverse effect of impurities on the reaction rate, however, $X_2$ in practice is controlled to 15 mole percent or less, generally in the range of 10 to 15 mole percent.

According to line 1, Table I, the normal operation is when $X_1$ and $X_2$ are 0.5 and 13.0 mole percent, respectively. For this condition, the vent rate is 33.2 Kg./hr. for a DNT feed rate of 4,540 Kg./hr. If (line 2, Table I), $X_1$ were to increase suddenly to 0.75 mole percent, the vent rate would increase by feedback control to a steady-state value of 51.1 Kg./hr. to maintain an impurity concentration of 13.0 mole percent. If then (line 3, Table I), it were attempted to maintain the vent rate constant at the normal value of 33.2 Kg./hr., the impurity concentration in the reactor would increase to 25.4 mole percent, which exceeds the value of 15 mole percent at which the catalyst activity starts to diminish. On the other hand, if the DNT feed rate were to suddenly increase to 5,440 Kg./hr. (see line 4, Table I), the vent flow rate would increase to a steady-state value of 41.5 Kg./hr. by feedforward control in order to maintain steady-state operation. Under steady-state conditions, the impurity concentration in the vent gas will contain a specified constant value within the range 10 to 15 mole percent.

It should be noted in Table I that the percent excess hydrogen ranges from only about 2 to 5 percent in order to purge impurities. The significance of this small excess can best be appreciated from the fact that the flow of vent gas is just controlled by the smallest commercially available non-special control valve, one-quarter inch diameter iron-pipe-size, despite the fact that the DNT flow rate is so large in magnitude, 4,540 Kg./hr.

Finally, in equations (1), (3), and (4), the vent rate $V$ is shown by its square, $V^2$. This is commonly known in control theory as "flow-square" and is done because of the following facts: (1) the square of the flow rate of a fluid flowing in turbulent flow is directly proportional to the pressure drop across either a control valve or an orifice plate and (2) the pressure drop through either the control valve or orifice plate is transmitted without change to the flow controller where it is added or subtracted from other flow rate pressure drop signals or from a set point. In other words, pneumatic controllers operate on pressure signals which in turn are proportional to the square of the flow rate. Hence, flow-square results are directly useful in pneumatic control systems without need for change.

The present invention can logically be termed a feed-forward-feedback system of control since (a) at least one feed stream, hydrogen, is analyzed for deviations and (b) the results are sent forward via the computer to the vent flow rate controller to anticipate and offset changes in the process conditions which otherwise would necessarily result. Also, the changes in vent gas composition are monitored, signals representative thereof are sent backward, advising the computer of the effect of any upsets and changes made to conteract them. This dual control system when utilized in a continuous process affords continuous close control of the operating conditions involving a liquid-gas reaction.

In a commercial process for hydrogenating dinitrotoluene, as well as other materials, it is customary to use as a source of hydrogen the by-product hydrogen produced in another process. The purity of the hydrogen, particularly when it is used directly with little or no intermediate purification, is dependent upon the character and operation of that other process. Upsets in that process, which may be caused by equipment breakdowns or changes in reaction conditions or changes in raw materials can cause rather substantial changes in the purity of the hydrogen by-product used in the present invention. When the hydrogen is purchased from another party in an "over the fence" arrangement (continuously produced and transmitted by pipe line from the producers plant to the users adjoining plant), upsets in purity concentration are beyond the control of the user and he must be prepared to accommodate these upsets or cease operations temporarily. The latter is an unacceptable alternative in case of a continuous process.

The equipment used in the control system for hydrogenating dinitrotoluene is commercially available and it can be pneumatically or electrically operated. The means for measuring and transmitting a signal representing the feed rate of dinitrotoluene can be accomplished with a flow meter such as the Target Meter, Model 11, 18-¾, manufactured by Foxboro. The means for analyzing the concentration of impurities in the gas feed and transmitting a signal representative thereof can be accomplished by sampling with a Mason-Neilan Type No. 138-11 diaphragm valve and analyzing by a Mine Safety Appliance Company Thermatron gas analyzer. The means for measuring and transmitting the vent gas flow rate can be an orifice plate used in conjunction with a differential pressure transmitter such as Model 13-A manufactured by Foxboro. The means for controlling the vent gas flow rate can be a Model 5322-TSD controller manufactured by Foxboro used with control valve such as No. 138-11 manufactured by Mason-Neilan.

The following example illustrates the invention.

EXAMPLE

A cylindrical stainless steel reactor is used for hydrogenating dinitrotoluene. Both hydrogen gas at a rate of 321 Kg./hr. containing about 0.5 mole percent inert impurities (mostly methane) and dinitrotoluene at a rate of 4,540 Kg./hr. are fed into the lower region of the reactor. Liquid metatolylene diamine is drawn from the bottom of the reactor, most of which is recycled through a cooler before being returned to the top of the reactor, and the remainder removed as product. The tolylene diamine product flow rate is 3,040 Kg./hr. The amount of water formed in the reaction is 1,792 Kg./hr., part of which is removed with the vent gas and the remainder with the tolylene diamine product. The vent gas flow depends on the concentration of impurities therein which preferably is about 13.0 mole percent on the basis of water-saturated vent gas at steady state and normal operating conditions. Under these conditions 11.7 Kg. water per hour is removed with the vent gas and the remainder (1,780 Kg.) with the diamine product.

In operation the actual flow rate of dinitrotoluene feed is sensed by an orifice place (4,540 Kg./hr. normally) and a signal representing the flow rate is transmitted by a flow transmitter to an analog computer. The concentration of impurities in the hydrogen feed is also measured and a signal representing the hydrogen feed impurity concentration (normally 0.5 mole percent) is transmitted to the analog computer. The vent gas (i.e., the gas phase in the reactor) is analyzed and a signal representing its impurity level (normally 13.0 mole percent on a water-wet basis) is transmitted to the analog computer.

The analog computer is programmed to accept these signals and to determine the desired amount of gas ($V$) to be vented to return the process to the normally steady state reaction conditions or maintain it there as the case may be. The computer utilizes the following equation:

$$(V)^2 = (0.132)^2 (F)^2 [X_1 + K(e + (de/dt)\gamma)]^2 / (X_2)^2$$

where:
 $F$ = dinitrotoluene feed rate (e.g., 4,540 Kg./hr.)
 $X_1$ = actual impurity concentration in the feed hydrogen (0.5 mole percent normally)
 $X_2$ = actual impurity concentration of the vent gas (13.0 mole percent at normal steady state)
 $e$ = error difference between the desired (normal) and the actual impurity concentration of the vent gas ($e$=0 for steady state conditions) mole percent
 $K$ = controller gain (percent per volt)
 $\gamma$ = process time constant of gas contained in the reactor and the vent gas system (minutes)

$t$ = time (minutes)
$V$ = vent gas flow rate on water-wet basis (33.3 Kg./hr. at normal steady state).

In this equation, controller gain $K$ is chosen to have the value 5 but it may range from 1 to 10 inclusive without affecting the steady-state value of the vent gas flow rate. The process time constant $\gamma$ is more complex. It is, for practical purposes, the total volume of gas contained in the reactor and the vent gas system all divided by the vent gas flow rate. More exactly, the process time constant of both the gas system and the instruments used to control the vent gas flow rate is obtained from a Bode plot which is described in "Techniques of Process Control" by P. S. Buckley, N.Y., Wiley, 1964. In this technique, a sinusoidal variation is caused in the feed hydrogen flow rate. The frequency is measured for both the feed-hydrogen stream variation and the vent gas flow rate variation and the log of this ratio is plotted against the log of the frequency of variation in the feed-hydrogen stream. The process time constant $\gamma$ is the reciprocal of the feed-hydrogen stream variation frequency when the graphical relationship just mentioned is extrapolated back to a value of zero on the ordinate scale. For illustrative purposes, a value of 3 minutes is chosen for $\gamma$ but it may range from 2 to 5 minutes without affecting the steady-state vent gas flow rate.

In order to illustrate the operation of the present invention, suppose that the concentration of impurity in the hydrogen feed, $X_1$, were to increase abruptly from the normal value of 0.5 mole percent up to a new value of 0.75 mole percent. If the vent gas flow rate were not increased, the reactor impurity concentration would increase to 25.4 mole percent (as shown in line 3, Table I) at which concentration the catalyst activity would be reduced. Assume, then that the reactor impurity concentration, $X_2$, would increase from the normal value of 13.0 mole percent up to a new value of 14.0 mole percent and that this change occurred in 15 minutes. The error, $e$, is $(14.0 - 13.0)$ or 1.0 percent and the rate of change of the error, $de/dt$, is $1.0/15$ or 0.0667 mole percent per minute. The calculations carried out by the computer to obtain the new value of the vent rate are as follows:

$[X_1 + K(e + (de/dt)\gamma)]^2/(X_2)^2$ is equal to:
$[0.5 + (5)(1 + (0.0667)(3))]^2/(13.0)^2 = 0.25.$ The square of the vent gas flow rate is given by the equation:

$$(V)^2 = (0.132)^2(F)^2(0.25)$$

which for the feed rate $F$ of 4,540 Kg./hr. dinitrotoluene is equal to $8.95 \times 10^4$. From this result, $V$ is calculated to be 299 Kg./hr. While the vent gas flow rate would have such a large value initially, it would rapidly be reduced to 51.1 Kg./hr. if $X_1$ of the feed were to continue at the value of 0.75 mole percent or to 33.3 Kg./hr. if $X_1$ were to revert to its normal value of 0.5 mole percent. The factor of importance to be noted here is that the impurity concentration $X_2$ of the reactor would deviate little from the desired value of 13.0 mole percent because of the corrective action of the control system of this invention.

In operation, following an impurity upset of 0.25 mole percent in the gas feed, a signal representing the required vent gas flow rate calculated by the computer to offset the upset (e.g., a rate of 299 Kg./hr.) is automatically sent to a vent gas flow rate controller where it is used as a set point and compared with a signal from an orifice plate which continuously measures the actual vent gas flow rate. The controller then emits a signal representing the deviation of the actual flow rate from the set point and this signal is sent to the vent control valve to change the actual flow rate to the required flow rate. As the error difference between the actual and the desired impurity concentration in the reactor (vent gas) decreases, the required vent gas flow rate, as calculated in accordance with equation (1) by the analog computer decreases, thus causing a change in the set point of the flow rate controller in the direction of the normal flow rate. The control system of this invention has been found to be capable, despite gas feed impurity upsets involving changes of up to 40 percent in impurity concentration, of maintaining the impurity content in the reactor gas phase within one percent of the desired value whereas prior art feedback control systems permitted variances several fold this amount.

I claim:

1. In a continuous process for reacting a liquid with an impure gas in a reaction zone containing a liquid phase and a gas phase whereby liquid and gas reactants are continuously fed to the reaction zone and reaction product and unreacted gas are continuously removed, the improvement consisting essentially of periodically transmitting to a computer signals representing
   a. the liquid feed rate
   b. the concentration of impurities in the gaseous reactant
   c. the concentration of impurities in the gas phase in the reaction zone said computer being programmed to generate a signal representative of gas removal rate $V$ in accordance with the equation $V^2 = (0.132)^2 F^2 [X_1 + K(e + (de/dt)\gamma)]^2/(X_2)^2$ where:

$F$ = gas feed rate, Kg./hr.
$X_1$ = actual impurity concentration in the feed gas, mole percent
$X_2$ = actual impurity concentration of the vent gas, mole percent
$e$ = error difference between the desired (normal) and the actual impurity concentration of the vent gas ($e=0$ for steady state conditions), mole percent
$K$ = controller gain (percent per volt)
$\gamma$ = process time constant of gas contained in the reactor and the vent gas system (minutes)
$t$ = time (minutes)
$V$ = vent gas flow rate on water-wet basis, Kg./hr. and adjusting the gas removal rate in accordance with the signal so generated.

2. The process of claim 1 in which the computer generated signal is transmitted to a vent gas controller which automatically adjusts the gas removal rate in accordance with the generated signal.

3. The process of claim 1 in which the reactant liquid is dinitrotoluene and the reactant gas is hydrogen.

4. The process of claim 3 in which the reactant gas fed to the reaction zone is hydrogen having a purity of at least about 98 mole percent.

5. The process of claim 4 in which the gas phase in the reaction zone has an impurity content of about 10–15 percent.

6. Apparatus for controlling the efficiency of a reaction between a liquid and a gas phase comprising
   a. a closed reactor fitted with inlet ports for reactant gas and reactant liquid and exit ports for reaction product and unreacted reactant gas, b. means for measuring and transmitting a signal representative of the rate of flow of reactant liquid to the reactor,
c. means for measuring and transmitting a signal representative of the concentration of impurities in the flow of reactant gas to the reactor,
d. means for measuring and transmitting a signal representative of the concentration of impurities in the gas phase of the reactor,
e. means for measuring and transmitting a signal representative of the flow rate of gas leaving the reactor,
f. computer means adapted for collecting the above signals and programmed to compute therefrom a flow rate for gas leaving the reactor to maintain the impurity content of the gas phase in the reaction zone within predetermined limits, and
g. means for adjusting the flow rate of gas leaving the reactor to the flow rate prescribed by the computer.

* * * * *